US008977463B2

(12) United States Patent
Inoue et al.

(10) Patent No.: US 8,977,463 B2
(45) Date of Patent: Mar. 10, 2015

(54) VEHICLE BRAKE CONTROLLER AND VEHICLE BRAKE CONTROL METHOD

(71) Applicant: Advics Co., Ltd., Kariya (JP)

(72) Inventors: Takuya Inoue, Tokoname (JP); Yusuke Takeya, Miyoshi (JP); Masato Terasaka, Ichinomiya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 18 days.

(21) Appl. No.: 13/836,561

(22) Filed: Mar. 15, 2013

(65) Prior Publication Data
US 2013/0261918 A1 Oct. 3, 2013

(30) Foreign Application Priority Data

Mar. 30, 2012 (JP) ................................. 2012-081701

(51) Int. Cl.
*B60T 8/28* (2006.01)
*B60T 8/26* (2006.01)
*B60T 8/88* (2006.01)

(52) U.S. Cl.
CPC . *B60T 8/28* (2013.01); *B60T 8/268* (2013.01); *B60T 8/885* (2013.01); *B60T 2270/406* (2013.01)
USPC .................... 701/70; 701/48; 701/71; 701/78; 701/83

(58) Field of Classification Search
CPC ......... B60L 7/18; B60L 7/26; B60L 15/2009; B60L 15/2018; B60T 8/24; B60T 8/245; B60T 8/28; B60T 8/268; B60T 8/885; B60T 2270/406

USPC ..................................... 701/48, 70–71, 78, 83
See application file for complete search history.

(56) References Cited

U.S. PATENT DOCUMENTS

| | | | |
|---|---|---|---|
| 5,482,361 A * | 1/1996 | Burckhardt et al. .......... 303/186 |
| 2001/0006306 A1 * | 7/2001 | Kagawa et al. ................. 303/20 |
| 2004/0024513 A1 * | 2/2004 | Aizawa et al. .................. 701/70 |
| 2004/0040765 A1 * | 3/2004 | Satou et al. .................... 180/170 |
| 2005/0216164 A1 * | 9/2005 | Sakata ............................ 701/70 |
| 2006/0064225 A1 * | 3/2006 | Tabata et al. ................... 701/96 |
| 2007/0050110 A1 * | 3/2007 | Kondoh et al. ................. 701/36 |
| 2008/0007116 A1 * | 1/2008 | Takahashi et al. ......... 303/113.3 |
| 2008/0036294 A1 * | 2/2008 | Yamamoto et al. ........ 303/116.1 |
| 2009/0187322 A1 * | 7/2009 | Yasui et al. .................... 701/70 |

(Continued)

FOREIGN PATENT DOCUMENTS

JP    2007-203810 A    8/2007

*Primary Examiner* — Mary Cheung
*Assistant Examiner* — Atul Trivedi
(74) *Attorney, Agent, or Firm* — Buchanan Ingersoll & Rooney PC

(57) ABSTRACT

A vehicle brake controller is capable of executing limit control for limiting increase in braking force applied to front wheels by using a deceleration of a vehicle. The vehicle brake controller is configured to start the limit control when the deceleration of the vehicle becomes greater than or equal to a start determination value before a start determination time period elapses after a deceleration starting point in time, at which the deceleration of the vehicle is started by application of braking force at least to the front wheels. The vehicle brake controller is configured to end the limit control if the deceleration of the vehicle is less than an end determination value, which is greater than the start determination value, at a point in time when an end determination time period, which is longer than the start determination time period, has elapsed from the deceleration starting point in time.

9 Claims, 6 Drawing Sheets

(56) References Cited

U.S. PATENT DOCUMENTS

| | | | |
|---|---|---|---|
| 2009/0198426 A1* | 8/2009 | Yasui et al. | 701/70 |
| 2010/0100295 A1* | 4/2010 | Inoue et al. | 701/69 |
| 2010/0168975 A1* | 7/2010 | Takahara et al. | 701/70 |
| 2010/0174453 A1* | 7/2010 | Takahara et al. | 701/41 |
| 2011/0184620 A1* | 7/2011 | Kato et al. | 701/70 |
| 2012/0049617 A1* | 3/2012 | Furuyama | 303/9.75 |
| 2013/0226429 A1* | 8/2013 | Udaka et al. | 701/73 |
| 2013/0304314 A1* | 11/2013 | Udaka | 701/34.4 |

* cited by examiner

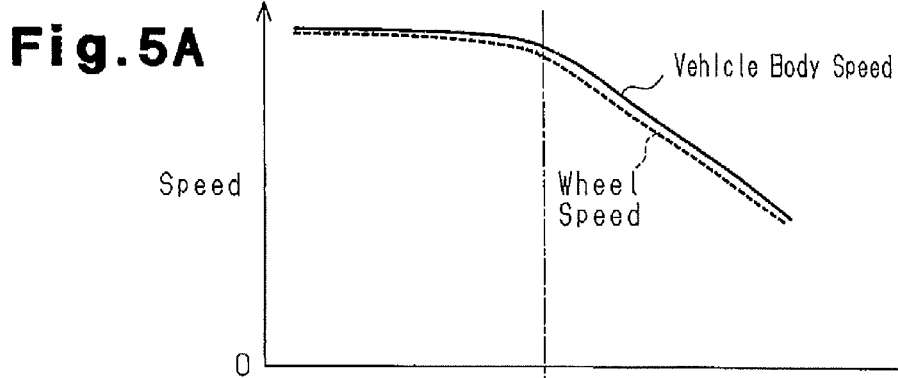
Fig.5A
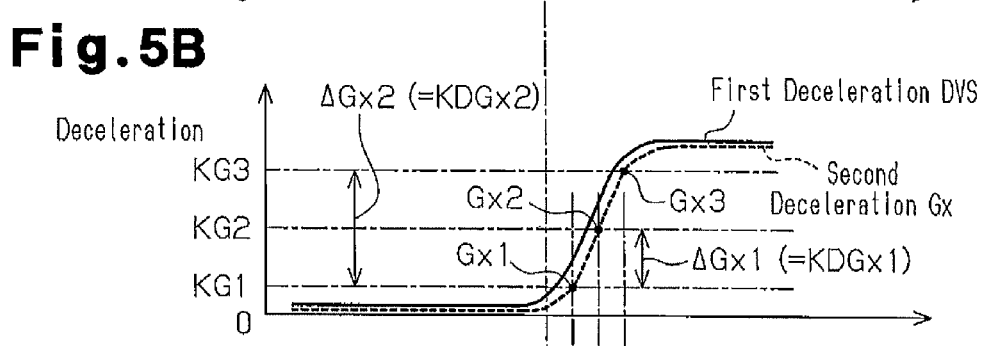
Fig.5B
Fig.5C
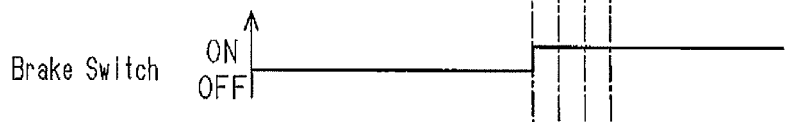
Fig.5D
Fig.5E
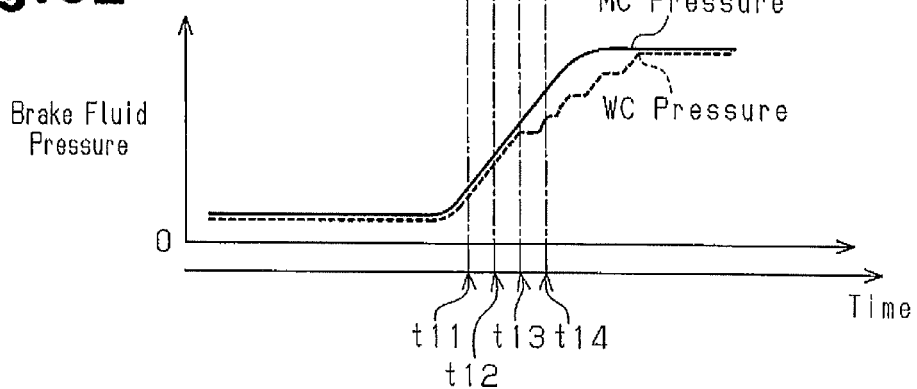

VEHICLE BRAKE CONTROLLER AND VEHICLE BRAKE CONTROL METHOD

BACKGROUND OF THE INVENTION

The present invention relates to a vehicle brake controller that adjusts braking force applied to wheels provided on a vehicle and to a vehicle brake control method.

When the vehicle is suddenly braked while running, the center of gravity of the vehicle may move forward. In particular, when the vehicle is suddenly braked while running on a high-μ road at a low speed, the center of gravity of the vehicle moves significantly forward, and a rear-wheel lift-up may occur, in which the vertical load of the rear wheels with respect to the road surface is reduced while the vertical load of the front wheels with respect to the road surface is increased. Since the occurrence of the rear-wheel lift-up results in the unstable behavior of the vehicle, limit control for limiting increase in the braking force applied to the front wheels is preferably executed if there is a possibility of occurrence of the rear-wheel lift-up. When the limit control is executed, forward movement of the center of gravity of the vehicle is reduced, and the rear-wheel lift-up becomes less likely to occur.

When performing such limit control, it is necessary to estimate the amount of movement of the center of gravity of the vehicle, and determine whether there is a possibility of occurrence of the rear-wheel lift-up. For example, Japanese Laid-Open Patent Publication No. 2007-203810 discloses a method for calculating the pitch angle speed, which is the rate of change of the pitch angle of a vehicle body (hereinafter, referred to as a first method). The first method includes acquiring the rate of change of the up-down direction acceleration of the front portion of the vehicle body and the rate of change of the up-down direction acceleration of the rear portion of the vehicle body, and computing the pitch angle speed based on the two rates of change of the up-down direction acceleration. If the computed pitch angle speed is greater than a predetermined threshold value, it is determined that there is a possibility of occurrence of the rear-wheel lift-up due to the significant movement of the center of gravity of the vehicle.

However, in the first method, two up-down direction acceleration sensors need to be provided in the vehicle to detect the up-down direction acceleration of the front portion and the rear portion of the vehicle body. This increases the costs of the vehicle. Thus, a second method has been proposed that estimates whether there is a possibility of occurrence of the rear-wheel lift-up without using detection signals from the up-down direction acceleration sensors.

In the second method, elapsed time is measured from when deceleration of the vehicle associated with the braking operation by the driver is detected. If front-back direction deceleration of the vehicle exceeds a start determination value before the elapsed time reaches a predetermined start determination time period, it is determined that there is a possibility of occurrence of the rear-wheel lift-up due to the significant forward movement of the center of gravity of the vehicle. The front-back direction deceleration used in such determination process is a value based on a detection signal from a front-back direction acceleration sensor provided in the vehicle.

Since the front-back direction deceleration is a value acquired by subjecting a detection signal from the front-back direction acceleration sensor to a process such as known filtering, the front-back direction deceleration changes after a delay from the actual deceleration of the vehicle. Also, since the front-back direction acceleration sensor used in such control is not necessarily always arranged at the position of the center of gravity of the vehicle, a response delay corresponding to the distance between the arrangement position and the position of the center of gravity of the vehicle may occur in the detection signal from the front-back direction acceleration sensor. Therefore, the start determination value is preferably set to a relatively small value to avoid delay in starting of the limit control.

However, disturbance such as vibration according to variation in the road surface reaction force that the vehicle wheels receive from the road and vibration associated with variation of the gear range of the transmission of the vehicle are likely to be superimposed on the detection signal from the front-back direction acceleration sensor. Therefore, when the start determination value is set to a relatively small value, when the front-back direction deceleration is temporarily increased by the influence of the disturbance, the starting condition of the limit control is satisfied even though sudden braking is not performed. Thus, the limit control may be unnecessarily started. In this case, as compared to a case where the limit control is not executed, the braking force of the entire vehicle is decreased by the amount corresponding to the decrease in the braking force applied to the front wheels.

The start determination value is preferably set to a relatively large value to reduce unnecessary executions of the limit control described above. However, in this case, even if the vehicle is actually suddenly braked, the starting condition of the limit control is not easily satisfied, and the starting of the limit control may be delayed.

SUMMARY OF THE INVENTION

Accordingly, it is an objective of the present invention to provide a vehicle brake controller that reduces decrease in the deceleration of a vehicle associated with unnecessary execution of a limit control while optimizing a starting point in time of the limit control, and a vehicle brake control method.

In accordance with a first aspect of the present invention, a vehicle brake controller is provided that is capable of executing limit control for limiting increase in braking force applied to a front wheel by using a deceleration of a vehicle based on a detection signal from a front-back direction acceleration sensor and of setting a point in time of start of the limit control. The vehicle brake controller is configured to: start the limit control when the deceleration of the vehicle becomes greater than or equal to a start determination value before a start determination time period elapses after a deceleration starting point in time, at which the deceleration of the vehicle is started by application of braking force at least to the front wheel, and end the limit control if the deceleration of the vehicle is less than an end determination value that is greater than the start determination value, at a point in time when an end determination time period that is longer than the start determination time period, has elapsed from the deceleration starting point in time.

With the above-mentioned configuration, if the deceleration of the vehicle becomes greater than or equal to the start determination value before the elapsed time after the deceleration starting point in time reaches the start determination time period, the limit control is started, so that increase in the braking force applied to the front wheels is limited, and thus reducing occurrence of the rear-wheel lift-up. If disturbance is superimposed on the detection signal from the front-back direction acceleration sensor, the deceleration of the vehicle significantly fluctuates by the influence of the disturbance. Thus, the starting condition of the limit control may be satisfied at the point in time at which the deceleration is temporarily increased, and the limit control may be unnecessarily started. However, in this case, since the deceleration does not keep increasing even after the limit control is started, the deceleration of the vehicle at the point in time at which the end determination time period has elapsed after the deceleration starting point in time is unlikely to be greater than or equal to the end determination value. As a result, the limit control is promptly ended if the limit control is unnecessarily started by the influence of the disturbance.

That is, the start determination value may be set to a relatively small value. Even if the limit control is unnecessarily started by setting the start determination value as described above, the unnecessarily started limit control is promptly ended by providing the end determination value, which is greater than the start determination value. After ending the limit control, braking force applied to the front wheels is promptly increased. Thus, while optimizing the starting point in time of the limit control, it is possible to reduce decrease in the deceleration of the vehicle due to the execution of the unnecessary limit control.

In accordance with a second aspect of the present invention, a vehicle brake controller is provided that is capable of executing limit control for limiting increase in braking force applied to a front wheel by using a deceleration of a vehicle based on a detection signal from a front-back direction acceleration sensor and of setting a point in time of start of the limit control. The vehicle brake controller is configured to: start the limit control when a first deceleration difference is greater than or equal to a start determination change amount, wherein the first deceleration difference is a difference between a deceleration of the vehicle at a deceleration starting point in time, at which the deceleration of the vehicle is started by application of braking force at least to the front wheel, and a deceleration of the vehicle at a point in time at which a start determination time period has elapsed after the deceleration starting point in time, and end the limit control when a second deceleration difference is less than an end determination change amount that is greater than the start determination change amount, wherein the second deceleration difference is a difference between the deceleration of the vehicle at the deceleration starting point in time and a deceleration of the vehicle at a point in time at which an end determination time period that is longer than the start determination time period, has elapsed after the deceleration starting point in time.

With the above-mentioned configuration, when the first deceleration difference is greater than or equal to the start determination change amount, increase in the braking force applied to the front wheels is limited by starting the limit control, and occurrence of the rear-wheel lift-up is reduced. When disturbance is superimposed on the detection signal from the front-back direction acceleration sensor, the starting condition of the limit control may be satisfied since the deceleration is temporarily increased, and the limit control may be unnecessarily started. However, in this case, the deceleration does not keep increasing even after the limit control is started, and the second deceleration difference is unlikely to exceed the end determination change amount. As a result, if the limit control is unnecessarily started by the influence of the disturbance, the limit control is promptly ended.

That is, the start determination change amount may be set to a relatively small value. Even if the limit control is unnecessarily started by setting the start determination change amount as described above, the unnecessarily started limit control is promptly ended by providing the end determination change amount, which is greater than the start determination change amount. As a result, braking force applied to the front wheels is promptly increased. Thus, while optimizing the starting point in time of the limit control, it is possible to reduce decrease in the deceleration of the vehicle due to the execution of the unnecessary limit control.

When the vehicle is running on an uphill road, even if the driver applies the brakes suddenly, the center of gravity of the vehicle is unlikely to move forward. Thus, the possibility of occurrence of the rear-wheel lift-up is low. Therefore, when the vehicle is running on an uphill road, execution of the limit control is preferably inhibited. Therefore, if the disturbance is superimposed on the detection signal from the front-back direction acceleration sensor when the vehicle is running on an uphill road, the limit control is prevented from being unnecessarily started.

When the vehicle is running on a downhill road, the gravity acting on the vehicle body acts on the front-back direction acceleration sensor. That is, when the vehicle is stopped on the downhill road, the deceleration of the vehicle is offset by the amount corresponding to the gradient of the road and is greater than zero. Therefore, if the start determination value is set to the same value regardless of the gradient of the road when the vehicle is running on a downhill road, the starting point in time of the limit control may vary according to the gradient of the road on which the vehicle is running.

Also, if the end determination value is set to the same value regardless of the gradient of the road, when the limit control is unnecessarily executed by disturbance superimposed on the detection signal from the front-back direction acceleration sensor, the greater the gradient of the road, the more unlikely the end condition of the limit control may be satisfied. Thus, when the vehicle is running on a downhill road, the greater the gradient of the road, the greater the start determination value and the end determination value are preferably set. Thus, variation of the starting point in time of the limit control is reduced when the vehicle is running on a downhill road, and the unnecessarily started limit control is properly ended.

The deceleration starting point in time may be the starting point in time of the braking operation by the driver. However, the deceleration starting point in time may be set even if the vehicle is not substantially decelerating because of a small amount of braking operation performed by the driver. Therefore, when the driver applies the brakes such that the brake operation amount is increased from the state where the brake operation amount is small (hereinafter, referred to as a first state), the deceleration starting point in time is set before the vehicle starts to substantially decelerate. Thus, the starting condition of the limit control is less likely to be satisfied.

Furthermore, vehicles have been proposed that automatically apply the brakes suddenly before the driver applies the brakes when an obstacle is detected in front of the vehicle. Even when sudden braking is automatically performed in such vehicles, the limit control is preferably performed when there is a possibility of occurrence of the rear-wheel lift-up due to forward movement of the center of gravity of the vehicle. However, if the deceleration starting point in time is set to the starting point in time of the braking operation by the driver, the limit control cannot be performed even if there is a possibility of occurrence of the rear-wheel lift-up.

Thus, the deceleration starting point in time is preferably set to a point in time at which the deceleration of the vehicle becomes greater than or equal to a braking determination value, which is less than the start determination value. Accordingly, the point in time at which the vehicle has started to substantially decelerate from when application of braking force to at least the front wheels has been started can be set as the deceleration starting point in time. As a result, the limit control is started at a proper point in time. Also, since the deceleration starting point in time is set regardless of whether the driver is applying the brakes, the limit control is started when there is a possibility of occurrence of the rear-wheel lift-up also in the vehicle that automatically applies the brakes.

In accordance with a third aspect of the present invention, a vehicle brake control method is provided that includes: acquiring a deceleration of a vehicle based on a detection signal from a front-back direction acceleration sensor; setting a deceleration starting point in time, at which deceleration of the vehicle is started by application of braking force at least to a front wheel; starting to limit increase in the braking force applied to the front wheel when the deceleration of the vehicle becomes greater than or equal to a start determination value before a start determination time period elapses after the deceleration starting point in time; and ending limiting increase in the braking force applied to the front wheel if the deceleration of the vehicle is less than an end determination value that is greater than the start determination value, at a point in time when an end determination time period, which is longer than the start determination time period, has elapsed from the deceleration starting point in time. According to this configuration, advantages equivalent to those of the first and second aspects are obtained.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5A to 5E are explanatory timing charts of a case where limit control is properly started on sudden braking.

DETAILED DESCRIPTION OF THE PREFERRED EMBODIMENTS

A vehicle brake controller and a vehicle brake control method according to one embodiment will now be described with reference to FIGS. 1 to 6E. In the description herein, the cycle time of a main processing routine is 6 msec.

Figure 1:
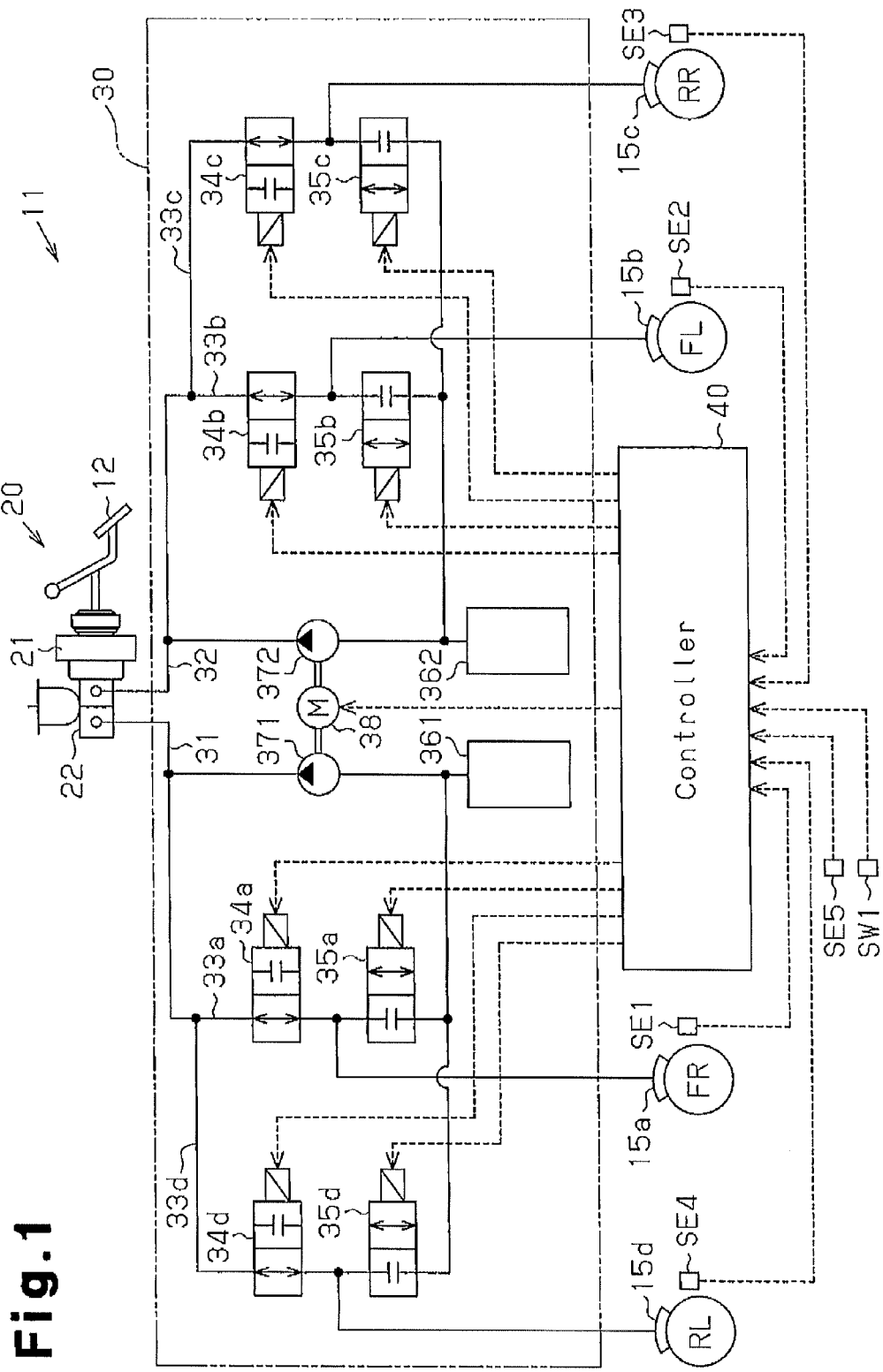
FIG. 1 is a block diagram illustrating a braking device mounted on a vehicle.

As shown in FIG. 1, a braking device 11 is mounted on a vehicle including (in this embodiment, four) wheels (a right front wheel FR, a left front wheel FL, a right rear wheel RR, and a left rear wheel RL). The braking device 11 includes a fluid pressure generating device 20, to which a brake pedal 12 is coupled, a brake actuator 30, which adjusts braking force applied to the wheels FR, FL, RR, RL, and a brake controller, which is a controller 40 in the present embodiment. The controller 40 controls the brake actuator 30.

The fluid pressure generating device 20 includes a booster 21, which boosts force applied to the brake pedal 12 by a driver, and a master cylinder 22, which generates brake fluid pressure (hereinafter, referred to as MC pressure) in accordance with the force applied to the brake pedal 12 boosted by the booster 21. During braking operation by the driver, brake fluid corresponding to the MC pressure generated in the master cylinder 22 is supplied from the master cylinder 22 to wheel cylinders 15*a*, 15*b*, 15*c*, 15*d* individually corresponding to the vehicle wheels FR, FL, RR, RL via the brake actuator 30. Then, braking force corresponding to the brake fluid pressure (hereinafter, referred to as WC pressure) that is generated in the wheel cylinders 15*a* to 15*d* is applied to the vehicle wheels FR, FL, RR, RL.

The brake actuator 30 includes a first hydraulic circuit 31, which is connected to the wheel cylinder 15*a* for the right front wheel and the wheel cylinder 15*d* for the left rear wheel, and a second hydraulic circuit 32, which is connected to the wheel cylinder 15*b* for the left front wheel and the wheel cylinder 15*c* for the right rear wheel. The first hydraulic circuit 31 includes a path 33*a* for the right front wheel and a path 33*d* for the left rear wheel. The second hydraulic circuit 32 includes a path 33*b* for the left front wheel and a path 33*c* for the right rear wheel. The paths 33*a* to 33*d* include normally-open type solenoid valves, which are pressure booster valves 34*a*, 34*b*, 34*c*, 34*d* in the present embodiment, and normally-closed type solenoid valves, which are reducing valves 35*a*, 35*b*, 35*c*, 35*d* in the present embodiment. The pressure booster valves 34*a*, 34*b*, 34*c*, 34*d* are actuated when regulating increase in the WC pressure of the wheel cylinders 15*a* to 15*d*. The reducing valves 35*a*, 35*b*, 35*c*, 35*d* are actuated when decreasing the WC pressure.

Furthermore, the hydraulic circuits 31, 32 include reservoirs 361, 362, which temporarily store the brake fluid that has flowed out from the wheel cylinders 15*a* to 15*d* via the reducing valves 35*a* to 35*d*, and pumps 371, 372, which draw in the brake fluid that is temporarily stored in the reservoirs 361, 362 and discharge the brake fluid toward the master cylinder 22 of the hydraulic circuits 31, 32. The pumps 371, 372 are actuated by a common drive motor 38.

The controller 40 will now be described.

Wheel speed sensors SE1, SE2, SE3, SE4 for detecting the wheel speed (outer circumference speed) of the wheels FR, FL, RR, RL, a front-back direction acceleration sensor SE5 for detecting acceleration in the front-back direction of the vehicle, and a brake switch SW1 for detecting operation of the brake pedal 12 are electrically connected to an input-side interface of the controller 40, which functions as a control unit. The front-back direction acceleration sensor SE5 outputs a detection signal that has a positive value during vehicle acceleration and a detection signal that has a negative value during deceleration of the vehicle on a road that is parallel to the horizontal surface. Thus, acceleration based on the detection signal from the front-back direction acceleration sensor SE5 is a positive value when the vehicle is stopped on an uphill road, and is a negative value when the vehicle is stopped on a downhill road.

The valves 34*a* to 34*d*, 35*a* to 35*d*, and the drive motor 38 are electrically connected to an output-side interface of the controller 40. The controller 40 controls the operation of the valves 34*a* to 34*d*, 35*a* to 35*d*, and the drive motor 38 based on various detection signals from the various sensors SE1 to SE5 and the brake switch SW1.

The controller 40 includes a microcomputer constituted by components such as a CPU, a ROM, and a RAM. The ROM of the microcomputer previously stores programs for performing various control processes, and information such as various maps and various threshold values. Furthermore, the RAM stores various kinds of information that is rewritten as needed while a non-illustrated ignition switch of the vehicle is on.

When the driver brakes suddenly, the center of gravity of the vehicle significantly moves forward so that a rear-wheel lift-up may occur, in which the vertical load of the rear wheels RR, RL with respect to the road is reduced. Therefore, if it is determined that there is a possibility of occurrence of the rear-wheel lift-up during braking operation by the driver, limit control is preferably performed for limiting increase in the braking force applied to the front wheels FR, FL. When the limit control is performed, forward movement of the center of gravity of the vehicle is reduced, and the vertical load of the rear wheels RR, RL with respect to the road surface becomes less likely to be reduced. This reduces the occurrence of the rear-wheel lift-up.

In the limit control of the present embodiment, the pressure booster valves 34a, 34b for the front wheels FR, FL are closed and opened repeatedly. Accordingly, in response to the increase in the MC pressure in the master cylinder 22, the WC pressure in the wheel cylinders 15a, 15b for the front wheels FR, FL is increased after a delay. As a result, in contrast to the increase in the braking force applied to the rear wheels RR, RL, the braking force applied to the front wheels FR, FL is gradually increased.

Various processing routines executed by the controller 40 for reducing occurrence of the rear-wheel lift-up during braking operation by the driver will now be described.

Figure 2:
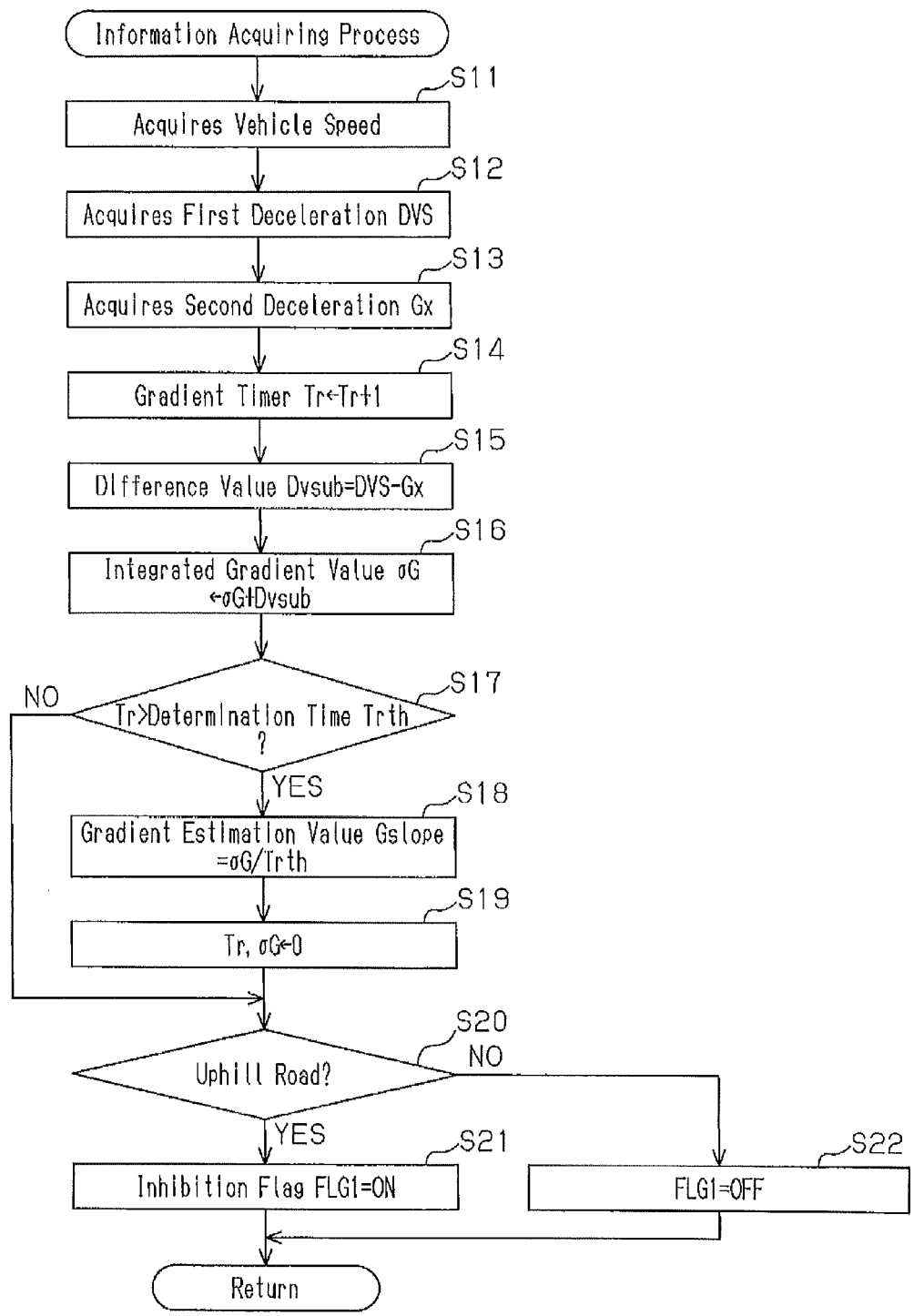
FIG. 2 is a flowchart for explaining a routine of an information acquiring process executed by a controller according to one embodiment of a vehicle brake controller according to one embodiment.

First, an information acquiring process routine will be described with reference to flowchart shown in FIG. 2.

The information acquiring process routine is executed at every predetermined cycle that is set in advance. In the information acquiring process routine, the controller 40 acquires a vehicle body speed VS based on the wheel speed of at least one of the vehicle wheels FR, FL, RR, RL (step S11). Subsequently, the controller 40 acquires a first deceleration DVS based on the acquired body speed VS (step S12). More specifically, the controller 40 acquires the body acceleration by calculating the time derivative of the body speed VS, and acquires the first deceleration DVS by multiplying the body acceleration by −1. Thus, the first deceleration DVS is a negative value during vehicle acceleration, and is a positive value during deceleration of the vehicle.

The controller 40 then acquires the deceleration, which is a second deceleration Gx, based on the detection signal from the front-back direction acceleration sensor SE5 (step S13). The second deceleration Gx is a value acquired by multiplying the acceleration by −1 based on the detection signal from the front-back direction acceleration sensor SE5. Thus, in the present embodiment, step S13 corresponds to an acquiring step. The controller 40 and the front-back direction acceleration sensor SE5 constitute an acquiring unit, which acquires the deceleration of the vehicle. Subsequently, the controller 40 increments a gradient timer Tr by one (step S14).

The controller 40 then subtracts the second deceleration Gx acquired in step S13 from the first deceleration DVS acquired in step S12 to obtain the difference value DVsub (step S15). Subsequently, the controller 40 adds the difference value DVsub computed in step S15 to an integrated gradient value σG, and sets the resultant as a new integrated gradient value σG (step S16). The controller 40 determines whether the gradient timer Tr updated in step S14 has surpassed a determination time Trth (for example, 67 time cycles, that is, 402 msec.) that has been set in advance (step S17). When the gradient timer Tr is less than or equal to the determination time Trth (step S17: NO), the controller 40 proceeds to step S20, which will be discussed below.

When the gradient timer Tr exceeds the determination time Trth (step S17: YES), the controller 40 divides the integrated gradient value σG computed in step S16 by the determination time Trth to obtain a gradient estimation value Gslope (step S18). The gradient estimation value Gslope has a positive value when the road surface is an uphill road, and has a negative value when the road is a downhill road. The controller 40 resets the gradient timer Tr and the integrated gradient value σG to zero (step S19), and proceeds to step S20.

At step S20, the controller 40 determines whether the road surface on which the vehicle is running is an uphill road based on the gradient estimation value Gslope computed in step S18. More specifically, if the gradient estimation value Gslope is greater than an uphill road determination value (>0) that is previously set for determining whether the road is an uphill road, the controller 40 determines that the road surface is an uphill road. If the controller 40 determines that the road surface is an uphill road (step S20: YES), an inhibition flag FLG1 is set to ON (step S21), and the information acquiring process routine is temporarily suspended. If the controller 40 determines that the road surface is not an uphill road (step S20: NO), the inhibition flag FLG1 is set to OFF (step S22), and the information acquiring process routine is temporarily suspended.

Figure 3:
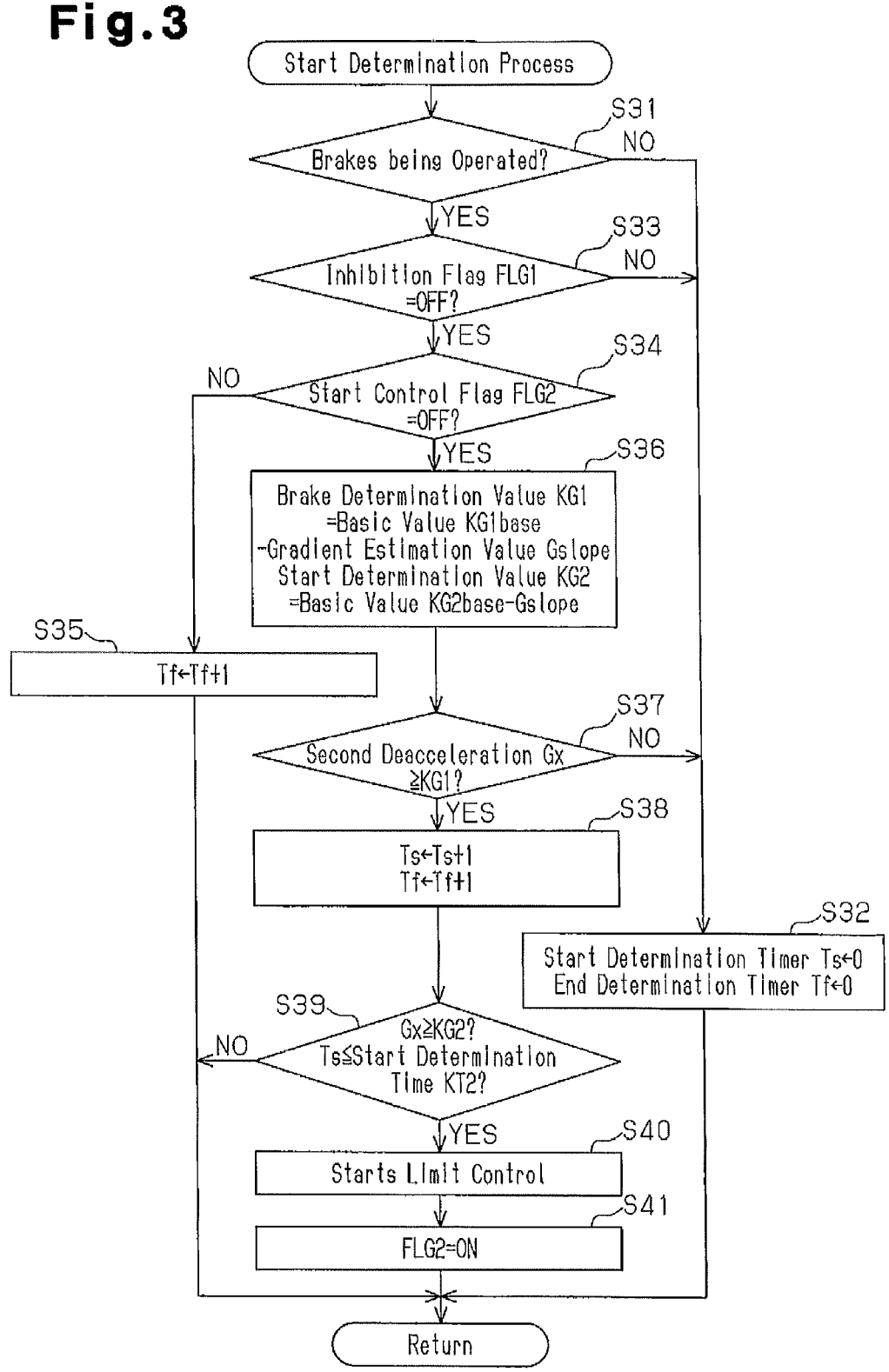
FIG. 3 is an explanatory flowchart of a routine of a start determination process executed by the controller.

The start determination process routine executed after the information acquiring process routine will now be described with reference to flowchart in FIG. 3. The start determination process routine is a process routine for setting the starting point in time of the limit control.

In the start determination process routine, the controller 40 determines whether the brakes are operated based on the detection signal from the brake switch SW1 (step S31). If the brakes are not operated (step S31: NO), the controller 40 resets a start determination timer Ts and an end determination timer Tf to zero (step S32), and temporarily suspends the start determination process routine. If the brakes are being operated (step S31: YES), the controller 40 determines whether the inhibition flag FLG1 is OFF (step S33). If the inhibition flag FLG1 is ON (step S33: NO), the controller 40 proceeds to step S32. That is, in the present embodiment, even if the driver applies the brakes suddenly, execution of the limit control is inhibited in a case where the road surface on which the vehicle is running is an uphill road.

If the inhibition flag FLG1 is OFF (step S33: YES), the controller 40 determines whether a start control flag FLG2 is OFF (step S34). The start control flag FLG2 is a flag that is set to ON when the limit control is being executed, and is set to OFF when the limit control is not being executed. If the start control flag FLG2 is ON (step S34: NO), the controller 40 increments the end determination timer Tf by one (step S35), and temporarily suspends the start determination process routine.

If the start control flag FLG2 is OFF (step S34: YES), the controller 40 performs a corrective process for correcting a braking determination value KG1 and a start determination value KG2 based on the gradient of the road surface (step S36). More specifically, the controller 40 subtracts the gradient estimation value Gslope from a basic value KG1base (for example, 0.2 G) to obtain the braking determination value KG1. Similarly, the controller 40 subtracts the gradient estimation value Gslope from the basic value KG2base (for example, 0.5 G) to obtain the start determination value KG2. As a result, when the vehicle is running on a downhill road, the greater the gradient of the road surface, the greater the value of the braking determination value KG1 and the start determination value KG2 are set. The braking determination value KG1 is a determination value for determining whether the vehicle has substantially started to decelerate due to the braking operation by the driver. The start determination value KG2 is a determination value for determining whether sudden braking that reduces the vertical load of the rear wheels RR, RL is applied.

The controller 40 determines whether the second deceleration Gx acquired in step S13 is greater than or equal to the braking determination value KG1 (step S37). If the second deceleration Gx is less than the braking determination value KG1 (step S37: NO), it is determined that the deceleration of the vehicle is extremely small since the braking force applied to the vehicle is small although the driver is applying the brakes, and the controller 40 proceeds to the aforementioned step S32.

If the second deceleration Gx is greater than or equal to the braking determination value KG1 (step S37: YES), it is determined that the vehicle has started to substantially decelerate in response to the braking operation by the driver, and the controller 40 increments the start determination timer Ts and the end determination timer Tf by one (step S38). That is, in the present embodiment, the point in time when the second deceleration Gx becomes greater than or equal to the braking determination value KG1 is set as a deceleration starting point in time. Therefore, the start determination timer Ts and the end determination timer Tf correspond to the elapsed time from the deceleration starting point in time. Thus, in the present embodiment, step S37 corresponds to a setting step for setting the deceleration starting point in time when the deceleration of the vehicle is started in response to the braking operation by the driver. The controller 40 constitutes a setting unit for setting the deceleration starting point in time.

Subsequently, the controller 40 determines whether the conditions including that the second deceleration Gx is greater than or equal to the start determination value KG2 and that the start determination timer Ts is less than or equal to the previously set start determination time period KT2 (for example, 10 cycle time, that is, 60 msec.) are both satisfied (step S39). If at least one of the conditions including that the second deceleration Gx is greater than or equal to the start determination value KG2 and that the start determination timer Ts is less than or equal to the start determination time period KT2 is not satisfied (step S39: NO), the controller 40 temporarily suspends the start determination process routine.

If both the conditions including that the second deceleration Gx is greater than or equal to the start determination value KG2 and that the start determination timer Ts is less than or equal to the start determination time period KT2 are satisfied (step S39: YES), the controller 40 starts the limit control (step S40). Thus, in the present embodiment, step S40 corresponds to a limit start step that starts limiting increase in the braking force applied to the front wheels FR, FL when the second deceleration Gx becomes greater than or equal to the start determination value KG2 before the start determination timer Ts reaches the start determination time period KT2. The controller 40 constitutes a limit start unit that starts limiting increase in the braking force applied to the front wheels FR, FL. The controller 40 sets the start control flag FLG2 to ON (step S41), and temporarily suspends the start determination process routine.

Figure 4:
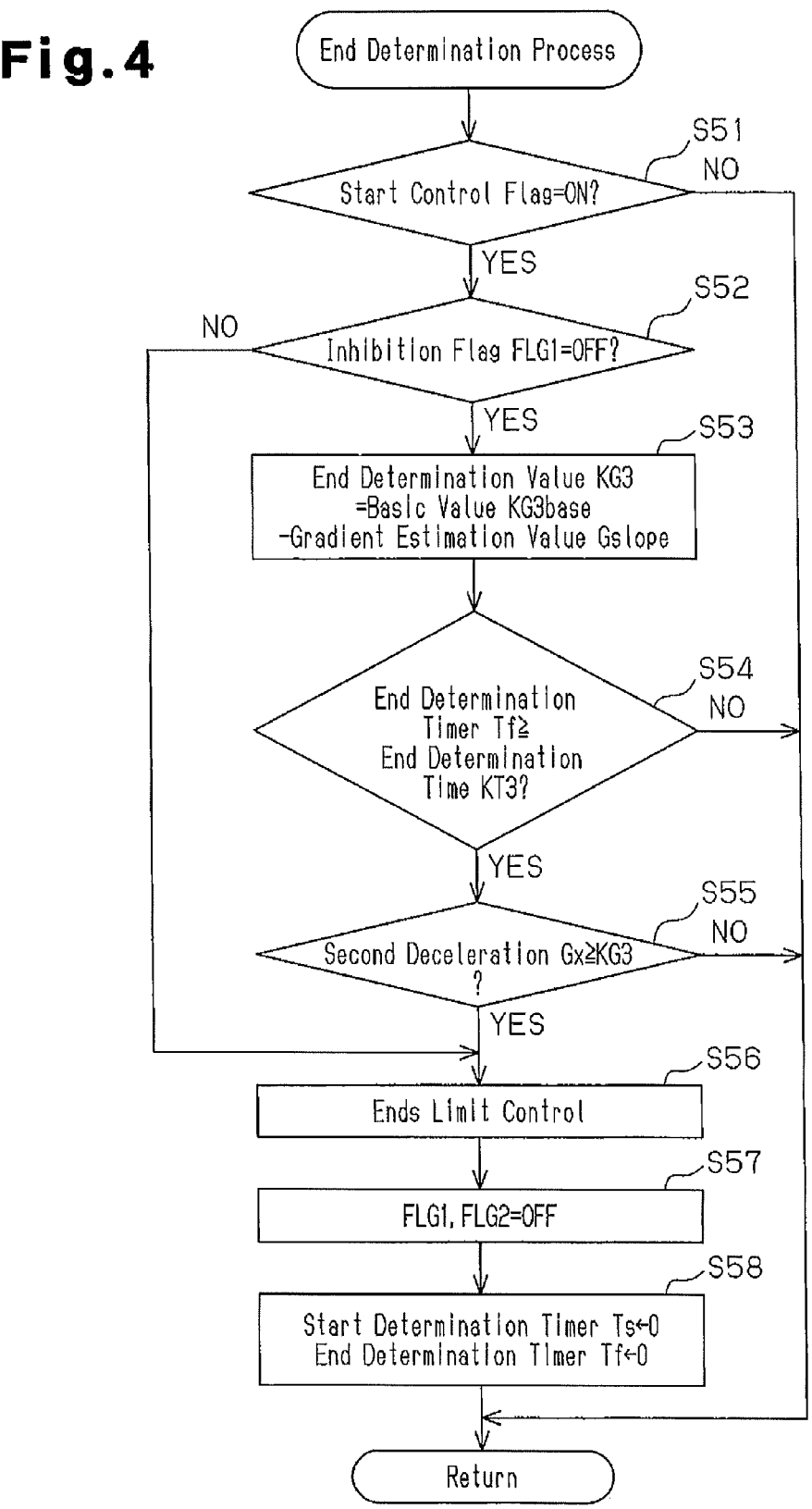
FIG. 4 is an explanatory flowchart of a routine of an end determination process executed by the controller.

The end determination process routine executed subsequently to the start determination process routine will now be described with reference to flowchart shown in FIG. 4. The end determination process routine is a process routine for ending, at an early stage, the limit control that has been started unnecessarily.

In the end determination process routine, the controller 40 determines whether the start control flag FLG2 is ON (step S51). If the start control flag FLG2 is OFF (step S51: NO), since the limit control is not executed, the controller 40 temporarily suspends the end determination process routine. If the start control flag FLG2 is ON (step S51: YES), the controller 40 determines whether the inhibition flag FLG1 is OFF (step S52). If the inhibition flag FLG1 is ON (step S52: NO), since the road surface on which the vehicle is running is an uphill road, the controller 40 proceeds to step S56, which will be discussed below.

If the inhibition flag FLG1 is OFF (step S52: YES), the controller 40 performs the corrective process for correcting an end determination value KG3 for determining the end point in time of the limit control that has been unnecessarily started in accordance with the road surface gradient (step S53). More specifically, the controller 40 subtracts the gradient estimation value Gslope from a basic value KG3base (for example, 0.8 G) to obtain the end determination value KG3. As a result, when the road surface is a downhill road, the greater the road surface gradient, the greater the end determination value KG3 is set. In the present embodiment, the end determination value KG3 is set to a great value that the second deceleration Gx does not exceed when the brakes are not applied suddenly.

Subsequently, the controller 40 determines whether the end determination timer Tf updated in steps S35, S38 is greater than or equal to an end determination time period KT3 (for example, 20 cycle time, that is, 120 msec.) that has been set in advance (step S54). If the end determination timer Tf is less than the end determination time period KT3 (step S54: NO), the controller 40 temporarily suspends the end determination process routine. If the end determination timer Tf is greater than or equal to the end determination time period KT3 (step S54: YES), the controller 40 determines whether the second deceleration Gx acquired in step S13 is less than the end determination value KG3 (step S55).

If the second deceleration Gx is greater than or equal to the end determination value KG3 (step S55: NO), it is determined that the current braking operation by the driver is a sudden braking, and the controller 40 temporarily suspends the end determination process routine to continue the limit control. If the second deceleration Gx is less than the end determination value KG3 (step S55: YES), it is determined that the current limit control has been unnecessarily started, and the controller 40 proceeds to the next step S56.

At step S56, the controller 40 ends the limit control that is being executed. More specifically, the controller 40 sets an indicated current value for the pressure booster valves 34a, 34b of the front wheels FR, FL to zero, and maintains the pressure booster valves 34a, 34b in the opened state. Thus, in the present embodiment, step S56 corresponds to a limit ending step that ends limiting increase in the braking force applied to the front wheels FR, FL if the second deceleration Gx is not greater than or equal to the end determination value KG3, that is, if the second deceleration Gx is less than the end determination value KG3 although the end determination timer Tf has surpassed the end determination time period KT3. The controller 40 constitutes an ending unit that ends limiting of increase in the braking force applied to the front wheels FR, FL.

The controller 40 sets the inhibition flag FLG1 and the start control flag FLG2 to OFF (step S57), and resets the start determination timer Ts and the end determination timer Tf to zero (step S58). Thereafter, the controller 40 temporarily suspends the end determination process routine.

Operation of the vehicle according to the present embodiment will now be described.

First, a case where the limit control is started at an proper point in time since there is a possibility of occurrence of the rear-wheel lift-up will be described with reference to timing charts in FIGS. 5A to 5E.

As shown in FIGS. 5A and 5C, when the driver starts to apply the brakes at a first point in time t11 while the vehicle is running, the braking force is applied to the vehicle wheels FR, FL, RR, RL, and the vehicle starts to decelerate. As shown in FIG. 5B, when the second deceleration Gx becomes greater than or equal to the braking determination value KG1 at a second point in time t12 based on the detection signal from the front-back direction acceleration sensor SE5, the start determination timer Ts and the end determination timer Tf start to count. That is, the second point in time t12 corresponds to the deceleration starting point in time in the present embodiment.

As shown in FIG. 5B, at a third point in time t13 when the start determination timer Ts reaches the start determination time period KT2, the second deceleration Gx becomes greater than or equal to the braking determination value KG2. That is, a first deceleration difference ΔGX1 (ΔGX1=GX2−GX1) between the second deceleration Gx1 at the second point in time t12, which is the deceleration starting point in time, and the second deceleration Gx2 at the third point in time t13, at which the start determination time period KT2 has elapsed after the deceleration starting point in time, becomes greater than or equal to a start determination change amount KDGx1.

Then, since the starting condition of the limit control is satisfied at the third point in time t13, the limit control is started as shown in FIG. 5D. In the limit control, the pressure booster valves 34a, 34b for the front wheels are repeatedly opened and closed. In the present embodiment, when the deceleration starting point in time is set, the limit control is started even before the third point in time t13 if the second deceleration Gx becomes greater than or equal to the start determination value KG2 before the third point in time t13.

Thereafter, the second deceleration Gx is further increased even when the limit control is being executed as shown in FIGS. 5A and 5B. Then, at a fourth point in time t14 at which the end determination timer Tf reaches the end determination time period KT3, the limit control is continued since the second deceleration Gx becomes greater than or equal to the end determination value KG3. That is, a second deceleration difference ΔGx2 (ΔGx2=GX3−GX1) between the second deceleration Gx1 at the second point in time t12, which is the deceleration starting point in time, and the second deceleration Gx3 at the fourth point in time t14 becomes greater than or equal to an end determination change amount KDGx2, which is greater than the start determination change amount KDGx1.

Therefore, the control of the pressure booster valves 34a, 34b as described above is continued. As a result, while the MC pressure in the master cylinder 22 is rapidly increased in response to the braking operation by the driver, the increase in the WC pressure in the wheel cylinders 15a, 15b for the front wheels is limited from the third point in time t13 as shown in FIG. 5E. In this manner, since the braking force applied to the front wheels FR, FL is gradually increased, forward movement of the center of gravity of the vehicle is reduced as compared to a case where the braking force applied to the front wheels FR, FL is rapidly increased. This reduces the occurrence of the rear-wheel lift-up.

A case where the limit control is unnecessarily started due to a significant disturbance superimposed on the detection signal from the front-back direction acceleration sensor SE5, such as when the vehicle passes over a step, will now be described with reference to timing charts in FIGS. 6A to 6E.

Figure 6A:
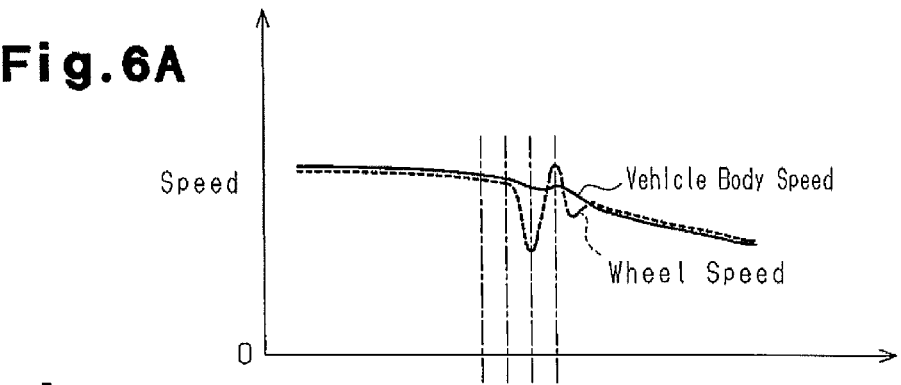
FIGS. 6A to 6E are explanatory timing charts of a case where the limit control is unnecessarily started.
Figure 6B:
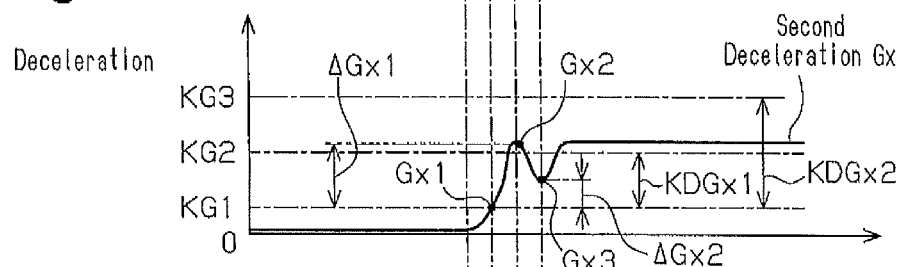
Figure 6C:

As shown in FIGS. 6A, 6B, and 6C, when the driver starts to apply the brakes at a first point in time t21 while the vehicle is running, the second deceleration Gx becomes greater than or equal to the braking determination value KG1 based on the detection signal from the front-back direction acceleration sensor SE5 at a second point in time t22. As a result, the start determination timer Ts and the end determination timer Tf start to count from the second point in time t22. That is, in this case, the second point in time t22 corresponds to the deceleration starting point in time.

From the second point in time t22, since a significant disturbance is superimposed on the detection signal from the front-back direction acceleration sensor SE5, the second deceleration Gx significantly fluctuates by the influence of the disturbance. Therefore, even if the brakes are not actually applied suddenly, the second deceleration Gx may become greater than or equal to the start determination value KG2 before a third point in time t23 at which the start determination timer Ts reaches the start determination time period KT2. In this case, since the first deceleration difference ΔGx1 is greater than or equal to the start determination change amount KDGx1, the limit control is unnecessarily started as shown in FIGS. 6D and 6E.

However, in this case, even if the second deceleration Gx significantly fluctuates due to the influence of the disturbance, the amount of braking operation performed by the driver is not great. Thus, at the fourth point in time t24, at which the end determination timer Tf reaches the end determination time period KT3, the second deceleration Gx is less than the end determination value KG3 as shown in FIG. 6B. That is, the second deceleration difference ΔGx2 is less than the end determination change amount KDGx2.

Figure 6D:
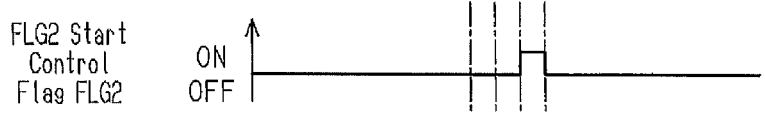
Figure 6E:
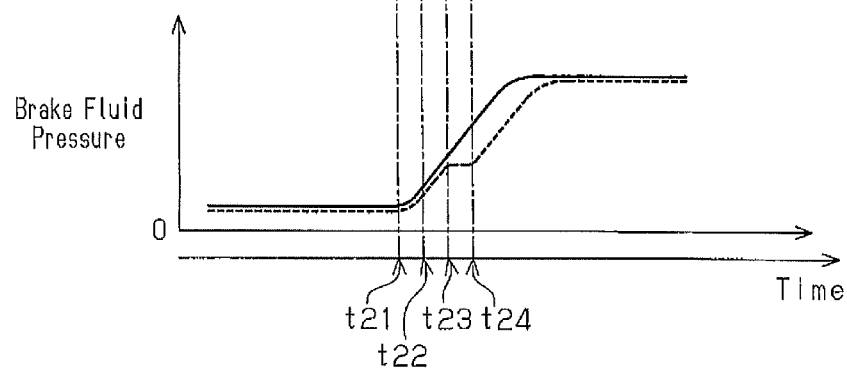

As a result, the unnecessarily started limit control is ended as shown in FIGS. 6D and 6E. Then, the pressure booster valves 34a, 34b for the front wheels are no longer controlled, and the WC pressure in the wheel cylinders 15a, 15b for the front wheels promptly increases to approximate the WC pressure in the master cylinder 22. Thus, the braking force applied to the front wheels FR, FL is promptly increased, and decrease in the actual deceleration of the vehicle due to execution of the unnecessary limit control is reduced.

As described above, the present embodiment has the following advantages.

(1) In the present embodiment, in addition to the start determination value KG2 and the start determination change amount KDGx1 for determining the start of the limit control, the end determination value KG3 and the end determination change amount KDGx2 for determining the end of the limit control are provided. Thus, since the start determination value KG2 and the start determination change amount KDGx1 can be set to small values, the limit control is started at an proper point in time when the driver applies the brakes suddenly that may cause the rear-wheel lift-up.

Setting the start determination value KG2 and the start determination change amount KDGx1 to small values may allow the limit control to be unnecessarily started by the influence of the disturbance superimposed on the detection signal from the front-back direction acceleration sensor SE5. However, the unnecessarily started limit control is promptly ended by providing the end determination value KG3 and the end determination change amount KDGx2. This reduces decrease in the deceleration of the vehicle due to execution of the unnecessary limit control.

(2) Furthermore, execution of the limit control is inhibited when the vehicle is running on an uphill road, where the rear-wheel lift-up is unlikely to occur. Therefore, when the vehicle is running on an uphill road, the limit control is prevented from being unnecessarily started even if the disturbance is superimposed on the detection signal from the front-back direction acceleration sensor SE5.

(3) In the present embodiment, if it is determined that the road surface on which the vehicle is running has become an uphill road, the currently executed limit control is ended. Thus, unnecessary execution of the limit control is reduced under the running condition where the rear-wheel lift-up is unlikely to occur.

(4) If the road surface on which the vehicle is running is a downhill road, the determination values KG1, KG2, KG3 are corrected to greater values as the gradient of the road surface is increased. By correcting the braking determination value KG1 as described above, the deceleration starting point in time is prevented from being set at a point in time when the vehicle is substantially hardly decelerated while running on a downhill road. This reduces the likeliness that the starting condition of the limit control being difficult to satisfy.

Also, variation of the starting point in time of the limit control due to the road surface gradient is reduced by correcting the start determination value KG2.

If the end determination value KG3 is not corrected in accordance with the road surface gradient, the end condition of the limit control is less likely to be satisfied when the limit control is unnecessarily started by the influence of the disturbance on a downhill road with a steep gradient. This is because the second deceleration Gx takes a value that is offset in the positive direction by the amount corresponding to the road surface gradient. In this point, even if the limit control is unnecessarily started by the influence of the disturbance, the end condition of the limit control is easily satisfied by correcting the end determination value KG3 based on the road surface gradient. Thus, the unnecessarily started limit control is properly ended.

(5) As a method for ending the unnecessarily started limit control, a method is considered in which the limit control is ended when the second deceleration Gx is decreased before the end determination timer Tf reaches the end determination time period KT3. However, in this case, if electrical noise is superimposed on the detection signal from the front-back direction acceleration sensor SE5, the second deceleration Gx acquired in the current point in time may be less than the second deceleration Gx acquired in the previous point in time, and may result in malfunction where the limit control is erroneously ended. Also, if the vehicle passes over a step during gentle braking, starting and ending of the limit control may be repeated. In this point, in the present embodiment, it is determined whether the end condition of the limit control is satisfied based on the second deceleration Gx at the point in time at which the end determination timer Tf reaches the end determination time period KT3. As a result, the possibility of occurrence of the above two problems is reduced.

The above described embodiment may be modified as follows.

The deceleration starting point in time may be a point in time at which the driver starts applying the brakes. In this case, the start determination time period KT2 and the end determination time period KT3 may be longer than the case in the above described embodiment.

In a case where sensors are provided for detecting the amount of braking operation performed by the driver and the MC pressure in the master cylinder 22, a point in time at which the brake operation amount or the MC pressure becomes greater than or equal to a predetermined braking determination value may be set as a deceleration starting point in time.

The start determination value KG2 may be a constant value regardless of the road surface gradient.

The end determination value KG3 may be a constant value regardless of the road surface gradient.

In a case where the loading of the vehicle is great, the second deceleration Gx changes after a delay with respect to the deceleration of the vehicle as compared to a case where the loading is small. Thus, the greater the loading of the vehicle, the greater the value of the start determination time period KT2 may be set. Also, the greater the loading of the vehicle, the longer the end determination time period KT3 may be set. However, even if at least one of the start determination time period KT2 and the end determination time period KT3 is corrected according to the loading, the end determination time period KT3 is longer than the start determination time period KT2.

Also, when the loading of the vehicle is great, since the load ratio of the rear wheels RR, RL is great, the rear-wheel lift-up is less likely to take place for the deceleration of the vehicle as compared to a case where the loading is small. Thus, the braking determination value KG1 and the start determination value KG2 may be corrected to a greater value as the loading of the vehicle is increased. This reduces variation of the starting point in time of the limit control due to the loading of the vehicle.

If it is determined that the vehicle is running on an uphill road after the limit control is started, the limit control may be continued. In this case, the process of step S52 is omitted in the above-mentioned end determination process routine.

Even if the road surface on which the vehicle is running is an uphill road, the limit control may be started when the conditions including that the start determination timer Ts is less than or equal to the start determination time period KT2 and that the second deceleration Gx is greater than or equal to the start determination value KG2 are both satisfied. In this case, in the above-mentioned start determination process routine, the process of step S33 is omitted.

The limit control may be started after the start determination timer Ts reaches the start determination time period KT2 even if the second deceleration Gx becomes greater than or equal to the start determination value KG2 before the start determination timer Ts reaches the start determination time period KT2.

The limit control may be started when the second deceleration Gx at the point in time when the start determination timer Ts reaches the start determination time period KT2 is greater than or equal to the start determination value KG2.

Even if the limit control is started, the limit control may be ended at the point in time when the second deceleration Gx becomes less than the start determination value KG2 before the end determination timer Tf reaches the end determination time period KT3. Accordingly, the unnecessarily started limit control is ended at an early stage.

In the limit control, the pressure booster valves 34a, 34b for the front wheels may be held in the closed state.

The brake actuator may be one that the braking force applied to the vehicle wheels FR, FL, RR, RL can be adjusted even when the driver is not applying the brakes. In the braking device including such a brake actuator, the limit control may be started when the starting condition of the limit control is satisfied even in a case where sudden braking is automatically performed.

Therefore, the present examples and embodiments are to be considered as illustrative and not restrictive and the invention is not to be limited to the details given herein, but may be modified within the scope and equivalence of the appended claims.

The invention claimed is:

1. A vehicle brake controller that is capable of executing limit control for delaying increase in braking force applied to a front wheel without delaying increase in braking force applied to a rear wheel by using a deceleration of a vehicle based on a detection signal from a front-back direction acceleration sensor and of setting a point in time of start of the limit control, wherein the vehicle brake controller is configured to:

start the limit control when the deceleration of the vehicle becomes greater than or equal to a start determination value before a start determination time period elapses after a deceleration starting point in time, at which the deceleration of the vehicle is started by application of braking force at least to the front wheel, and end the limit control if the deceleration of the vehicle is less than an end determination value that is greater than the start determination value, at a point in time when an end determination time period that is longer than the start determination time period, has elapsed from the deceleration starting point in time.

2. The vehicle brake controller according to claim 1, wherein the controller is configured to inhibit execution of the limit control when the vehicle is running on an uphill road.

3. The vehicle brake controller according to claim 1, wherein the controller is configured to set the start determination value and the end determination value such that, when the vehicle is running on a downhill road, the greater the gradient of the road surface, the greater the start determination value and the end determination value are set.

4. The vehicle brake controller according to claim 1, wherein the deceleration starting point in time is a point in time at which the deceleration of the vehicle becomes greater than or equal to a braking determination value that is less than the start determination value.

5. A vehicle brake controller that is capable of executing limit control for delaying increase in braking force applied to a front wheel without delaying increase in braking force applied to a rear wheel by using a deceleration of a vehicle based on a detection signal from a front-back direction acceleration sensor and of setting a point in time of start of the limit control, wherein the vehicle brake controller is configured to:

start the limit control when a first deceleration difference is greater than or equal to a start determination change amount, wherein the first deceleration difference is a difference between a deceleration of the vehicle at a deceleration starting point in time, at which the deceleration of the vehicle is started by application of braking force at least to the front wheel, and a deceleration of the vehicle at a point in time at which a start determination time period has elapsed after the deceleration starting point in time, and end the limit control when a second deceleration difference is less than an end determination change amount that is greater than the start determination change amount, wherein the second deceleration difference is a difference between the deceleration of the vehicle at the deceleration starting point in time and a deceleration of the vehicle at a point in time at which an end determination time period that is longer than the start determination time period, has elapsed after the deceleration starting point in time.

6. The vehicle brake controller according to claim 5, wherein the controller is configured to inhibit execution of the limit control when the vehicle is running on an uphill road.

7. The vehicle brake controller according to claim 5, wherein the controller is configured to set the start determination value and the end determination value such that, when the vehicle is running on an uphill road, the greater the gradient of the road surface, the greater the start determination value and the end determination value are set.

8. The vehicle brake controller according to claim 5, wherein the deceleration starting point in time is a point in time at which the deceleration of the vehicle becomes greater than or equal to a braking determination value, which is less than the start determination value.

9. A vehicle brake control method comprising:

acquiring a deceleration of a vehicle based on a detection signal from a front-back direction acceleration sensor;

setting a deceleration starting point in time, at which deceleration of the vehicle is started by application of braking force at least to a front wheel;

starting to execute limit control by delaying increase in the braking force applied to the front wheel without delaying increase in braking force applied to a rear wheel when the deceleration of the vehicle becomes greater than or equal to a start determination value before a start determination time period elapses after the deceleration starting point in time; and ending the limit control if the deceleration of the vehicle is less than an end determination value that is greater than the start determination value, at a point in time when an end determination time period, which is longer than the start determination time period, has elapsed from the deceleration starting point in time.

* * * * *